(12) United States Patent
Ikeda

(10) Patent No.: US 7,555,150 B2
(45) Date of Patent: Jun. 30, 2009

(54) FINGERPRINT INPUT APPARATUS

(75) Inventor: Munehiro Ikeda, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 670 days.

(21) Appl. No.: 10/867,651

(22) Filed: Jun. 16, 2004

(65) Prior Publication Data
US 2004/0258283 A1 Dec. 23, 2004

(30) Foreign Application Priority Data
Jun. 18, 2003 (JP) ............................. 2003-173437

(51) Int. Cl.
*G06K 9/00* (2006.01)
(52) U.S. Cl. ...................... 382/124; 382/115; 382/125; 382/126
(58) Field of Classification Search ......... 382/124–127, 382/115, 116, 120, 121; 356/71
See application file for complete search history.

(56) References Cited

U.S. PATENT DOCUMENTS

| | | | | |
|---|---|---|---|---|
| 6,064,753 A | * | 5/2000 | Bolle et al. | 382/125 |
| 6,522,773 B1 | * | 2/2003 | Houdeau | 382/124 |
| 6,918,519 B2 | * | 7/2005 | Vor Keller et al. | 224/244 |
| 6,970,584 B2 | * | 11/2005 | O'Gorman et al. | 382/126 |
| 7,266,226 B2 | * | 9/2007 | Hwang | 382/124 |

FOREIGN PATENT DOCUMENTS

| | | |
|---|---|---|
| JP | 04-092990 | 3/1992 |
| JP | 10-240900 | 9/1998 |
| JP | 11-225998 | 8/1999 |
| JP | 2000-057328 | 2/2000 |
| JP | 2002-159052 | 5/2002 |
| JP | 2002159052 A * | 5/2002 |

\* cited by examiner

*Primary Examiner*—Matthew C Bella
*Assistant Examiner*—Eric Rush
(74) *Attorney, Agent, or Firm*—Dickstein Shapiro LLP

(57) ABSTRACT

This invention provides a fingerprint input apparatus which detects that a finger is put on a sensor element, which can reduce power consumption, which requires fewer components, and which is simple in configuration. In a fingerprint input apparatus which includes a sensor element for reading a fingerprint and a switch for detecting that a finger is put on the sensor element, which is activated by an operation of the switch the switch is a push switch, the sensor element and the switch are fixed to a housing, and the switch is arranged on an opposite surface to a surface on which the sensor element is arranged, across the housing. The switch may be a pressure sensitive switch instead of a push switch, and the apparatus may further include a unit for notifying a user whether it is appropriate to apply a depression pressure.

10 Claims, 4 Drawing Sheets

7: LIGHT EMITTING UNIT

11: SENSOR ELEMENT
12: UPPER SURFACE
13: PLATE SPRING
14: SWITCH

FINGERPRINT INPUT APPARATUS

BACKGROUND OF THE INVENTION

1. Field of the Invention

The present invention relates to a fingerprint input apparatus for identifying an individual. More specifically, the present invention relates to a fingerprint input apparatus which includes a switch for detecting that a finger is put on a sensor element which reads a fingerprint, on an opposite surface to a surface on which the sensor element is provided, across a housing.

2. Description of the Related Art

Conventionally, a fingerprint input apparatus is normally used while being connected to another apparatus such as a computer. In order to prevent the computer from being operated by unspecific persons, it is necessary to check whether a user who is to operate the computer is a person permitted to operate the computer. To this end, the fingerprint input apparatus is used. The fingerprint input apparatus authenticates an operator by acquiring a fingerprint of the operator and comparing the fingerprint of the operator with a fingerprint of an operation-permitted person that is registered in advance.

As can be understood from the above, the fingerprint input apparatus is not an apparatus required to constantly operate. Due to this, with a view of reducing power consumption, it is desirable that the fingerprint input apparatus operates only when a fingerprint is input. In addition, it is necessary to ensure that the apparatus operates when the fingerprint is input. It is, therefore, necessary to detect that the fingerprint is input by some means and to start a predetermined operation in response to a detection signal.

If the fingerprint input apparatus does not include a special mechanism of generating a fingerprint input detection signal, it is necessary to always activate the apparatus, continuously acquire images from a sensor element, and determine whether each obtained image is a fingerprint image by means of software. To do so, the fingerprint input apparatus requires a storage capacity and a processing capacity for this software, and consumes a power, accordingly.

Examples of providing the fingerprint input apparatus with a switch for outputting the detection signal includes following Japanese Patent Application Laid-Open No. 10-240900 (JP-A). According to JP-A 10-240900, a read start switch is provided separately from an apparatus main body. However, the technique disclosed in JP-A 10-240900 is on the premise that an operator who takes fingerprints operates the switch. In addition, JP-A 10-240900 fails to describe providing optimum arrangement in which a person the fingerprint of which is taken operates the apparatus by a fingerprint detection target hand. Further, the example of JP-A 10-240900 is limited to the fingerprint input apparatus of such a type as to optically read the fingerprint.

The fingerprint input apparatus needs to acquire an image of a quality suited for an image processing performed for fingerprint authentication. The quality of the image depends on a depression pressure applied when a finger is put on the sensor element. To acquire the high quality image, therefore, it is necessary to put the finger on the sensor element with an appropriate depression pressure.

The apparatus disclosed in the JP-A 10-240900 does not include means for notifying the user whether the depression pressure is appropriate.

If the fingerprint input apparatus does not include the means for notifying the user whether the depression pressure is appropriate, the user inputs the fingerprint at an entirely arbitrary depression pressure. Due to this, the fingerprint input apparatus needs to install a software for determining the quality of the acquired image. The software is required to determine the quality of the image, and to reacquire an image if the quality does not reach a predetermined quality.

As can be seen, the fingerprint input apparatus which does not include the means for notifying the user whether the depression pressure is appropriate is required to perform a complicated software processing. As a result, a storage capacity and a processing amount of the software are disadvantageously increased, thereby disadvantageously increasing power consumption.

Considering the disadvantages, a fingerprint input apparatus which includes a switch for notifying a user of an appropriate finger depression pressure is known as disclosed in Japanese Patent Application Laid-Open No. 2000-57328 (JP-A).

FIG. 7 is a cross-sectional view of the fingerprint input apparatus disclosed in JP-A 2000-57328.

In FIG. 7, reference 11 represents a sensor element, 12 represents an upper surface of the sensor element 11, 13 represents a plate spring, and 14 represents a switch.

The fingerprint input apparatus shown in FIG. 7 includes the switch 14 for notifying the user of the appropriate depression pressure and the sensor element 11 which generates a fingerprint input detection signal. In the example of FIG. 7, the sensor element 11 itself is held by the plate spring 13 or the like. When the user puts a finger on the sensor element 11 and depresses the sensor element 11, the switch 14 arranged on a rear surface of the sensor element 11 is depressed, thereby generating a detection signal and activating the fingerprint input apparatus. The appropriate depression pressure is notified to the user by a repulsive force of the plate spring or by giving a feel that the switch is depressed.

The conventional technique disclosed in JP-A 2000-57328, however, requires the spring for holding the sensor element. The use of the spring causes the following two disadvantages.

First, the number of components increases. If the number of components increases, a cost is pushed up and a reduction in size and weight of the apparatus cannot be realized.

Second, a mechanism for fixing the spring to the sensor element and the housing is required. This mechanism is undesirable since the configuration of the apparatus is complicated.

In addition, the following disadvantages resulting from the configuration of the apparatus in which the sensor element itself moves occur.

First, since the apparatus is configured so that the sensor element moves and depresses the switch, a clearance is necessary between the rear surface of the sensor element and the switch. This disadvantageously hinders a reduction in the size of the apparatus.

Second, a mechanism such as a hinge or a guide for enabling the sensor element to properly move is required, thereby disadvantageously, undesirably complicating the configuration of the apparatus.

Third, a movable section such as the hinge tends to cause a malfunction, thereby disadvantageously deteriorating maintainability and reliability of the apparatus.

Fourth, since the fingerprint sensor element which needs to be exposed to an external world so as to contact with the finger is movable, it is difficult to realize the configuration with high waterproofness and high dustproofness.

SUMMARY OF THE INVENTION

It is an object of the present invention to provide a fingerprint input apparatus which can detect that a finger is put on a sensor element, which can reduce power consumption, which requires fewer components, and which is simple in configuration.

To solve the problem described above, there is provided a fingerprint input apparatus comprising: a sensor element for reading a fingerprint; and a switch for detecting that a finger is put on the sensor element, the fingerprint input apparatus being activated by an operation of the switch, wherein the switch is a push switch, wherein the sensor element and the switch are fixed to a housing, and wherein the switch is arranged on an opposite surface to a surface on which the sensor element is arranged, across the housing.

Further, there is provided a fingerprint input apparatus comprising: a sensor element for reading a fingerprint; and a switch for detecting that a finger is put on the sensor element, the fingerprint input apparatus being activated by an operation of the switch, wherein the switch is a pressure sensitive switch, wherein the sensor element and the switch are fixed to a housing, wherein the switch is arranged on an opposite surface to a surface on which the sensor element is arranged, across the housing, and wherein the apparatus further comprises means for notifying a user whether a depression pressure is appropriate.

DETAILED DESCRIPTION OF THE PREFERRED EMBODIMENTS

A first embodiment of the present invention will be described hereinafter with reference to the drawings.

[Configuration]

Figure 1:
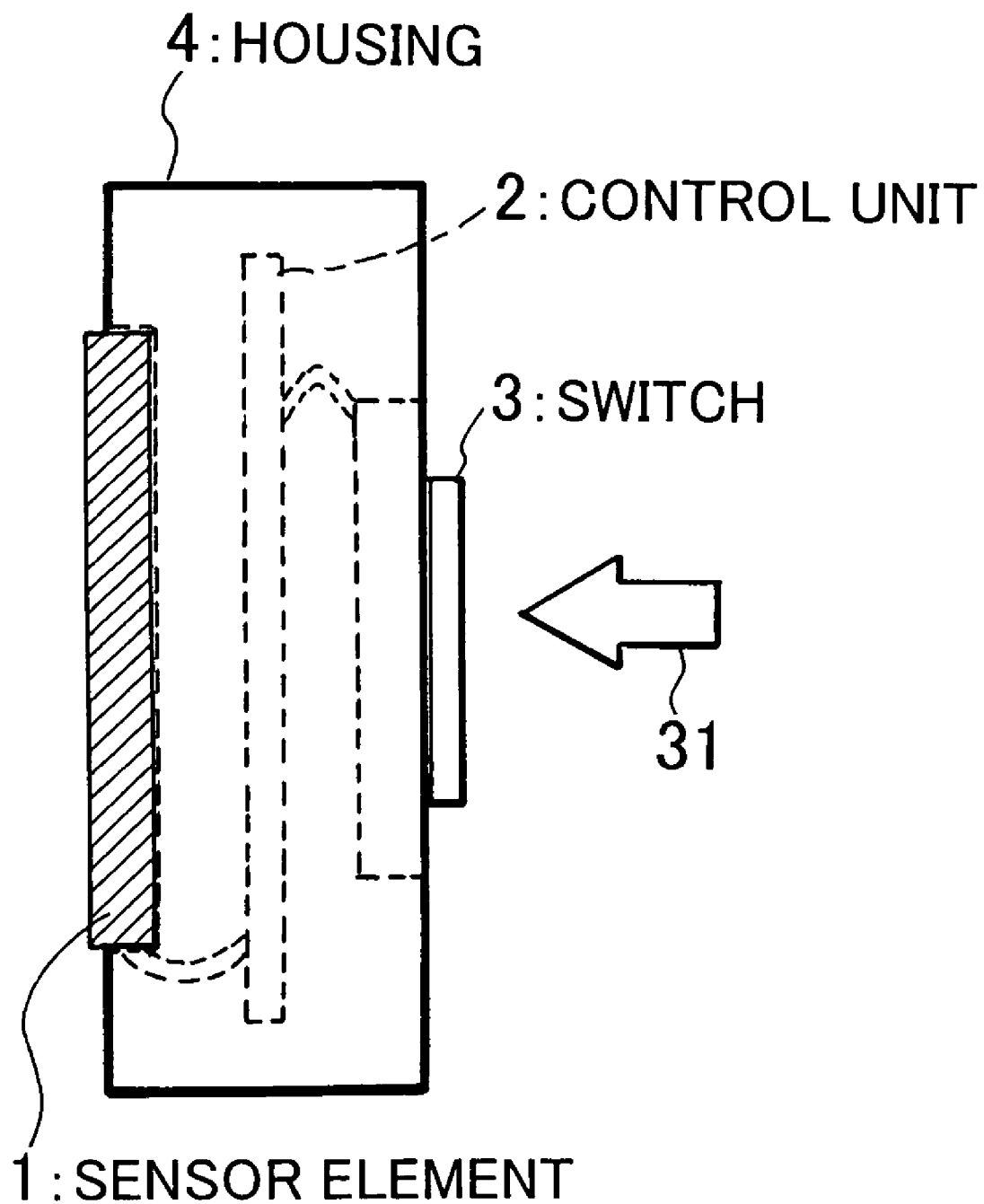
FIG. 1 is a cross-sectional view which illustrates configuration of a fingerprint input apparatus according to a first embodiment of the present invention.

FIG. 1 is a cross-sectional view which illustrates configuration of a fingerprint input apparatus according to the first embodiment of the present invention.

In FIG. 1, reference 1 represents a sensor element which reads a fingerprint. Examples of the sensor element 1 may include an element which optically reads an electrostatic capacitance generated between the sensor element surface and the ridge or trough of a fingerprint, an element which reads a temperature difference between the ridge and the trough of the fingerprint, and an element which reads a difference in pressure applied from the ridge and trough to the sensor element input surface. The sensor element of an arbitrary type or a type other than the above types can be employed according to the present invention.

Reference 2 represents a control unit for controlling entirety of the fingerprint input apparatus, and for processing a fingerprint image acquired from the sensor element 1. Reference 3 represents a push switch, and 4 represents a housing.

The sensor element 1, the control unit 2, and the switch 3 are fixedly attached to the housing 4, and the switch 3 is arranged on an opposite surface to a surface on which the sensor element 1 is arranged (a surface facing the sensor element surface) across the housing 4. The switch 3 can be depressed in a direction indicated by an arrow 31. A force necessary to depress the switch 3 is set in advance to be equivalent to a depression pressure at which the most favorable fingerprint image can be acquired when the finger is put on the sensor element 1. The control unit 2 can detect that the switch 3 is depressed.

[Operation]

Figure 2:
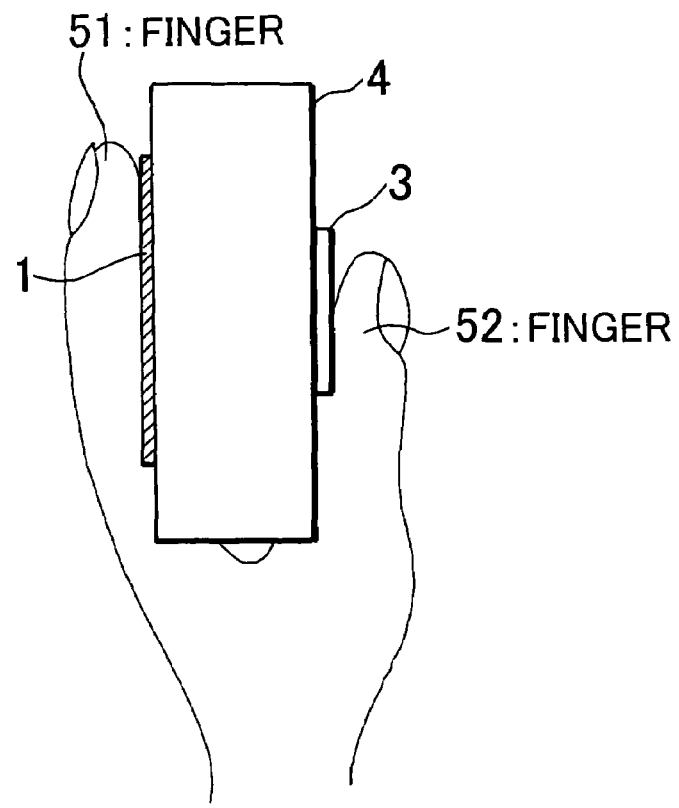
FIG. 2 is a side view which illustrates an operation of the fingerprint input apparatus according to the first embodiment of the present invention.
Figure 3:
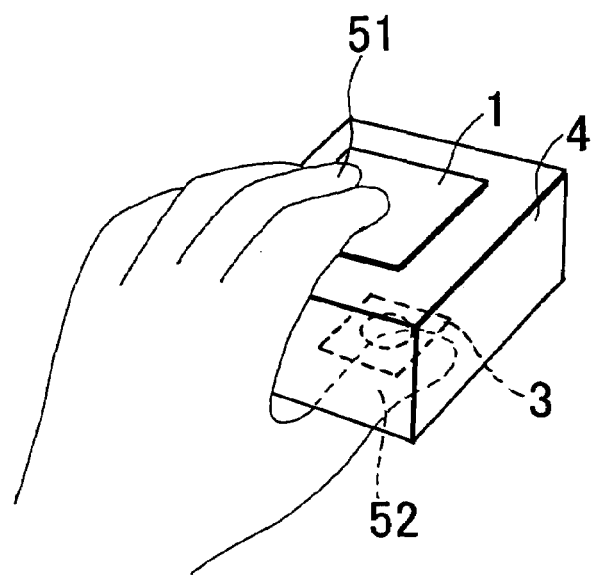
FIG. 3 is a perspective view which illustrates the operation of the fingerprint input apparatus according to the first embodiment of the present invention.

FIGS. 2 and 3 are a side view and a perspective view, respectively, which illustrate an operation of the fingerprint input apparatus according to the first embodiment of the present invention.

The fingerprint input apparatus according to the present invention is set in a standby state when not being used so as to minimize power consumption. In the standby state, only the necessary parts to detect the signal from the switch 3 are activated while the other parts are deactivated.

When the user uses the fingerprint input apparatus, a finger 51 a fingerprint of which is to be input is put on the sensor element 1, and the user grasps the apparatus so as to catch the housing 4 by the finger 51 and a finger 52. The switch 3 is arranged on the opposite surface to the surface on which the sensor element 1 is arranged. Therefore, the finger 52 is just located at a position of the switch 3 and directly contacts with the switch 3. By user's grasping the fingerprint input apparatus, the finger 52 depresses the switch 3. The force for depressing the switch 3 is set equivalent to the depression pressure at which the sensor element 1 can acquire the most favorable fingerprint image. The force for the finger 51 to depress the sensor element 1 is equal to the force for the finger 52 to depress the switch 3 since they have an action-reaction relationship. The user can be notified of the appropriate depression pressure for depressing the sensor element 1 by the depression force of the push switch. Accordingly, the force for the finger 51 to depress the sensor element 1 is equal to the depression pressure at which the most favorable fingerprint image can be obtained. Besides, by grasping the housing 4 by the fingers 51 and 52, the position of the finger 51 is fixedly secured onto the sensor element 1 without any shake.

By depressing the switch 3, a fingerprint input start signal is fed to the control unit 2 (see FIG. 1). In response to this input start signal, the fingerprint input apparatus which has been in the standby state is activated. The activated fingerprint input apparatus acquires a fingerprint image from the finger 51 put on the sensor element 1. Since the switch 3 is depressed, the finger 51 is put on the sensor element 1 and the depression pressure is ensured to be appropriate. Therefore, it is unnecessary to use the software to determine whether the image from the sensor element 1 is a fingerprint image and to determine whether the fingerprint image satisfies a predetermined quality.

The control unit 2 carries out a predetermined signal processing to the acquired fingerprint image. When the processing of the control unit 2 is finished, the fingerprint input apparatus is turned into the standby state again so as to suppress power consumption.

[Other Embodiments]

Figure 4:
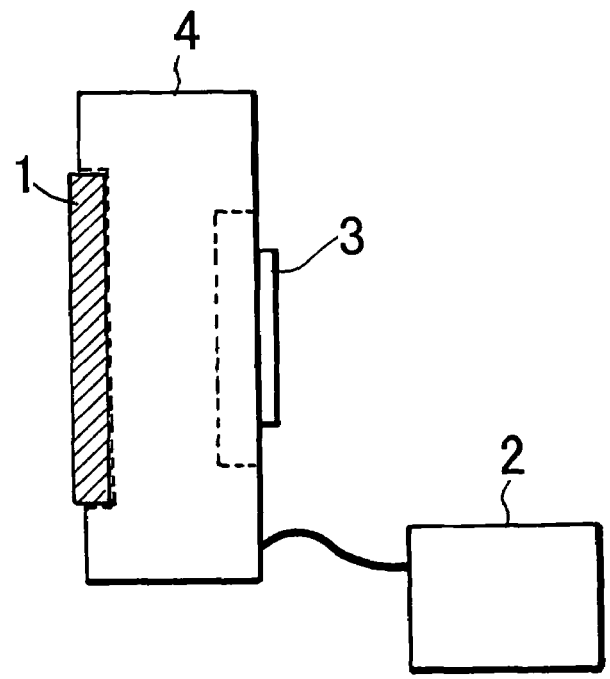
FIG. 4 illustrates a fingerprint input apparatus according to a second embodiment of the present invention.

FIG. 4 illustrates a fingerprint input apparatus according to a second embodiment of the present invention.

The second embodiment is an instance in which the control unit 2 is arranged outside of the housing 4 of the fingerprint input apparatus. In this instance, the function of the control unit 2 may be realized by using the function of an apparatus to which the fingerprint input apparatus is connected, e.g., a computer.

Figure 5:
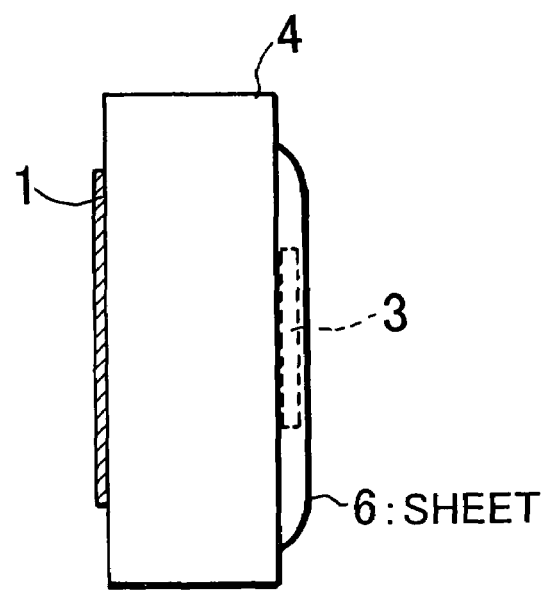
FIG. 5 illustrates a fingerprint input apparatus according to a third embodiment of the present invention.

FIG. 5 illustrates a fingerprint input apparatus according to a third embodiment of the present invention.

The third embodiment differs from the first embodiment shown in FIG. 1 in that a waterproof and flexible sheet 6 is added to the configuration of the first embodiment so as to cover the switch 3. By such a constituting, the housing 4 is completely sealed, making it possible to realize a fingerprint input apparatus excellent in waterproofness and dustproofness.

Figure 6:
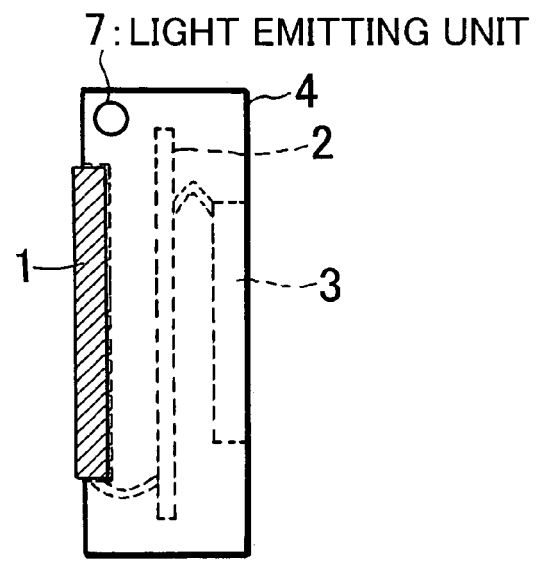
FIG. 6 illustrates a fingerprint input apparatus according to a fourth embodiment of the present invention.
Figure 7:
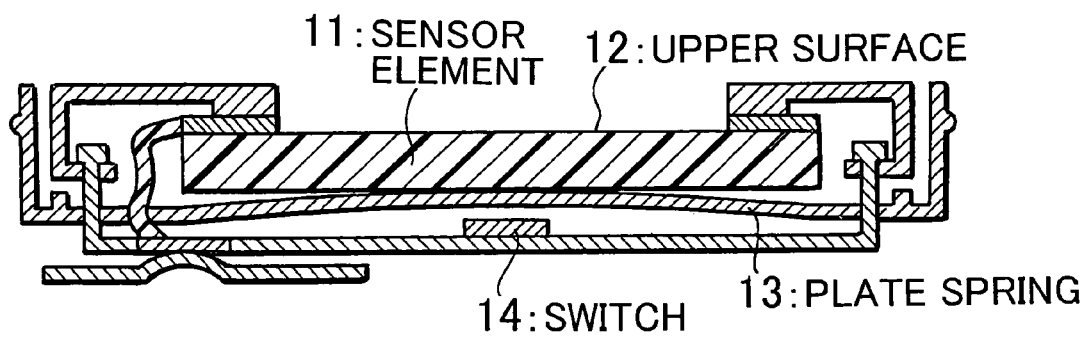
FIG. 7 is a cross-sectional view of a fingerprint input apparatus disclosed in JP-A 2000-57328.

FIG. 6 illustrates a fingerprint input apparatus according to a fourth embodiment of the present invention.

This embodiment is an instance in which the switch 3 which is the push switch according to the first embodiment is replaced by a pressure sensitive switch. Since the pressure sensitive switch includes no movable part, the apparatus can be reduced in size as compared with the apparatus using the push switch. In addition, the fingerprint input apparatus which has fewer malfunctions and higher reliability.

According to the first to the third embodiments, the user can apply the appropriate depression pressure to the sensor element 1 by the depression force of the push switch. On the other hand, the user cannot be notified of the appropriate depression pressure by the pressure sensitive switch. To compensate for this disadvantage, a light emitting unit 7 is provided. The light emitting unit 7 emits a light when the pressure sensitive switch 3 detects a preset pressure. This pressure is set at a depression pressure at which the sensor element 1 can acquire the most favorable fingerprint image similarly to the setting of the depression force of the push switch according to the first to the third embodiments. The user adjusts the depression pressure at which the sensor element 1 is depressed by the finger so that the light emitting unit 7 emits a light, whereby a fingerprint image of a favorable quality can be input.

A sound producing device such as a loudspeaker or a buzzer, or a tactually attracting device such as a vibrator instead of the light emitting unit can exhibit the same advantages.

Further, the control unit 2 may be arranged outside of the housing 4 as described in the fourth embodiment.

As stated so far, a first advantage of the present invention is that by generating a signal indicating that the finger is put on the sensor element 1 by the switch, the fingerprint input timing can be accurately acquired.

As a result, most of the parts of the fingerprint input apparatus can be deactivated and turned into a standby state at the time at which no fingerprint is input. Power consumption can be thereby reduced.

Further, the software processing for determining whether the input image from the sensor element is a fingerprint is unnecessary, so that the software can be simplified. The storage capacity and the processing amount for the software can be reduced, and the power consumption can be thereby reduced.

A second advantage of the present invention is that the number of components can be decreased as compared with the conventional method for which the mechanism of generating a signal indicating that the finger is put on the sensor element. Therefore, the apparatus low in cost, small in size and light in weight can be manufactured and supplied.

A third advantage of the present invention is that since the sensor element, which has been movable according to the conventional method, is immovable, the structure excellent in waterproofness and dustproofness can be provided.

A fourth advantage of the present invention is that since the movable part which tends to malfunction for the same reason as that for the third advantage.

A fifth advantage of the present invention is that by depressing the switch, the user can be notified of the appropriate depression pressure. It is thereby possible to always acquire the fingerprint images having high quality. As a result, the software processing for determining whether the acquired fingerprint image satisfies a predetermined image quality is unnecessary. The software can be simplified, and a power consumption can be reduced, accordingly.

A sixth advantage of the present invention is that by user's holding the housing, it is possible to prevent the finger shake while the fingerprint is input and to obtain the high quality fingerprint image.

What is claimed is:

1. A fingerprint input apparatus comprising: a sensor element for reading a fingerprint; and a switch for activating the fingerprint input apparatus, wherein the switch is a push switch, the sensor element and the switch are fixed to a housing, the housing having at least first and second outer surfaces at opposite sides of the housing, and at least one side surface connecting the first outer surface to the second outer surface, the sensor element being immobile with respect to the housing, and the switch is arranged on an external portion of the first outer surface and the sensor element is arranged on the second outer surface, across the housing.

2. The fingerprint input apparatus according to claim 1, wherein the switch is covered with a sheet.

3. The fingerprint input apparatus according to claim 1, wherein a control unit is arranged within the housing.

4. The fingerprint input apparatus according to claim 1, wherein a control unit is arranged outside of the housing.

5. A fingerprint input apparatus comprising: a sensor element for reading a fingerprint; and a switch for activating the fingerprint input apparatus, wherein the switch is a pressure sensitive switch, the sensor element and the switch are fixed to a housing, the housing having at least first and second outer surfaces at opposite sides of the housing, and at least one side surface connecting the first outer surface to the second outer surface, the sensor element being immobile with respect to the housing, the switch is arranged on an external portion of the first outer surface and the sensor element is arranged on the second outer surface, across the housing, and the apparatus further comprises means for notifying a user whether a depression pressure is appropriate.

6. The fingerprint input apparatus according to claim 5, wherein the means for notification is one of a light emitting unit, a sound producing unit, and a vibrator.

7. The fingerprint input apparatus according to claim 5, wherein a control unit is arranged within the housing.

8. The fingerprint input apparatus according to claim 5, wherein a control unit is arranged outside of the housing.

9. The fingerprint input apparatus according to claim 1, wherein the switch and the sensor element are arranged such that a finger of a user contacting the switch is different than a finger of the user contacting the sensor.

10. The fingerprint input apparatus according to claim 5, wherein the switch and the sensor element are arranged such that a finger of a user contacting the switch is different than a finger of the user contacting the sensor.

* * * * *